United States Patent [19]

Gillentine

[11] 4,087,885
[45] May 9, 1978

[54] ADJUSTABLE HINGE

[75] Inventor: Donald O. Gillentine, Dansville, Mich.

[73] Assignee: Rockwell International Corporation, Pittsburgh, Pa.

[21] Appl. No.: 813,197

[22] Filed: Jul. 5, 1977

[51] Int. Cl.[2] .................. E05D 11/00; A47C 1/00; B60N 1/02
[52] U.S. Cl. .................................. 16/146; 297/367
[58] Field of Search ............... 16/139, 140, 144, 145, 16/146, 189; 297/364, 366, 367

[56] References Cited

U.S. PATENT DOCUMENTS

| | | | |
|---|---|---|---|
| 3,737,946 | 6/1973 | Giuliani | 16/139 |
| 3,788,698 | 1/1974 | Perkins | 297/367 X |
| 3,840,268 | 10/1974 | Johndrow et al. | 297/366 |
| 3,897,608 | 8/1975 | Impicciche | 297/364 X |
| 3,902,757 | 9/1975 | Yoshimura | 16/146 X |

FOREIGN PATENT DOCUMENTS

| | | | |
|---|---|---|---|
| 1,296,060 | 5/1962 | France | 297/367 |
| 1,444,812 | 5/1966 | France | 16/146 |
| 2,645,097 | 4/1977 | Germany | 297/367 |

Primary Examiner—James Kee Chi

[57] ABSTRACT

An adjustable hinge includes a first arm having a pivot pin rigidly mounted thereto and extending to one side thereof along an axis with a bearing element mounted on the other side of the arm. A second arm is mounted on the bearing element and includes an arcuate toothed rack coaxially aligned with the axis. An arm retention plate overlies the second arm for retention thereof on the bearing element and additionally entraps a toothed locking pawl which is mounted within the bearing element for selective radial movement into and out of engagement with the arcuate rack. The pawl is provided an arcuate slot therethrough which has one end thereof closer to the pivot pin than the second end. A pawl actuating device is pivotally mounted on the pivot pin and includes a pawl locating pin displaced from the axis to extend through the arcuate slot of the locking pawl. Additionally, the pawl locating pin extends through aligned slots in the first arm and the arm retention plate to provide support at opposite sides of the arcuate slot of the pawl during movement of the actuating device which produces the desired radial movement of the pawl.

6 Claims, 5 Drawing Figures

ADJUSTABLE HINGE

BACKGROUND OF THE INVENTION

1. Field of the Invention

This invention relates to hinges for pivotally connecting the back frame of a vehicle seat and the cushion panel of a vehicle seat and, more particularly, to a releaseable locking device capable of being externally controlled for adjusting the angle of inclination of the back cushion relative to the seat cushion.

2. Description of the Prior Art

It is well known for the back frame of a vehicle seat to be adjustable in position relative to the cushion frame according to the requirements of the occupant. Although various types of hinge arrangements are known to permit such adjustment, a continuing need exists to provide such a hinge which is relatively inexpensive and capable of being reliably utilized throughout the life of the automobile.

As generally disclosed in U.S. Pat. Nos. 3,309,139; 3,788,698; 3,848,923; 3,897,608; 3,900,225; 3,902,757 and 3,931,996, there have been utilized seat hinges with lever actuated engaging means for selecting the relative angle of the hinge arms and for maintaining that angle according to the desires of the user. These devices typically include an extended lever arm which acts upon a pivotally mounted engaging element which is located remotely from the hinge axis.

There are, however, other devices such as those disclosed in U.S. Pat. No. 3,737,946 utilizing a different configuration which generally includes an arcuate rack associated with one arm of the hinge and a selectively engageable and disengageable pawl associated with the other arm of the hinge for selecting and maintaining the angle between the arms as desired. This device includes operating elements which are better protected and more compactly arranged than those discussed above. However, the means provided in this prior art device utilize camming surfaces to operate on a portion of the pawl in an unsupported, cantilevered fashion. Such an arrangement over the extended life of an automobile could result in bending or breaking of that portion of the pawl which is the primary area where forces are generated to produce this movement.

SUMMARY OF THE INVENTION

It is an object of this invention to provide an adjustable hinge for utilization between the back frame and cushion frame of a vehicle seat which is relatively simple to provide and capable of providing reliable operation throughout the life of the vehicle.

To provide this and other objects of the invention a preferred embodiment thereof includes an adjustable hinge comprising a first arm, a pivot pin rigidly secured to the first arm to extend to at least one side thereof and a bearing element extending from the other side of the arm and having a first bearing surface lying at least partially within a cylindrical surface which is coaxially aligned with the pivot pin. A second arm has an opening therethrough which is at least partially defined by a second bearing surface generally matching the first bearing surface so that the bearing element can be received within the opening to mount the second arm for rotation relative to the first arm about the axis. The second arm includes an arcuate toothed rack coaxially aligned with the second bearing surface. An arm retention plate is fixedly mounted relative to the bearing element to overlie the second arm for retention thereof on the bearing element. A toothed locking pawl is mounted relative to the first arm in general alignment with the arcuate rack for radial movement with respect to the axis for selective engagement with and disengagement from the arcuate rack. The locking pawl has an arcuate slot therethrough which includes a first end which is closer to the pivot pin than a second end thereof. A pawl actuating device is pivotally mounted on the pivot pin and includes a pawl locating pin displaced a predetermined distance from and extending in a direction parallel with the axis to be commonly received within the arcuate slot of the pawl and matching, aligned slots through the first arm and the retention plate. Each of the aligned slots has an arcuate shape with an effective radius from the axis which is equal to the predetermined distance so that the first arm and the retention plate support the locating pin at the aligned slots therethrough at both sides of the pawl to distribute operating forces acting along the locating pin during movement of the pawl thereby.

DESCRIPTION OF THE PREFERRED EMBODIMENT

Figure 1:
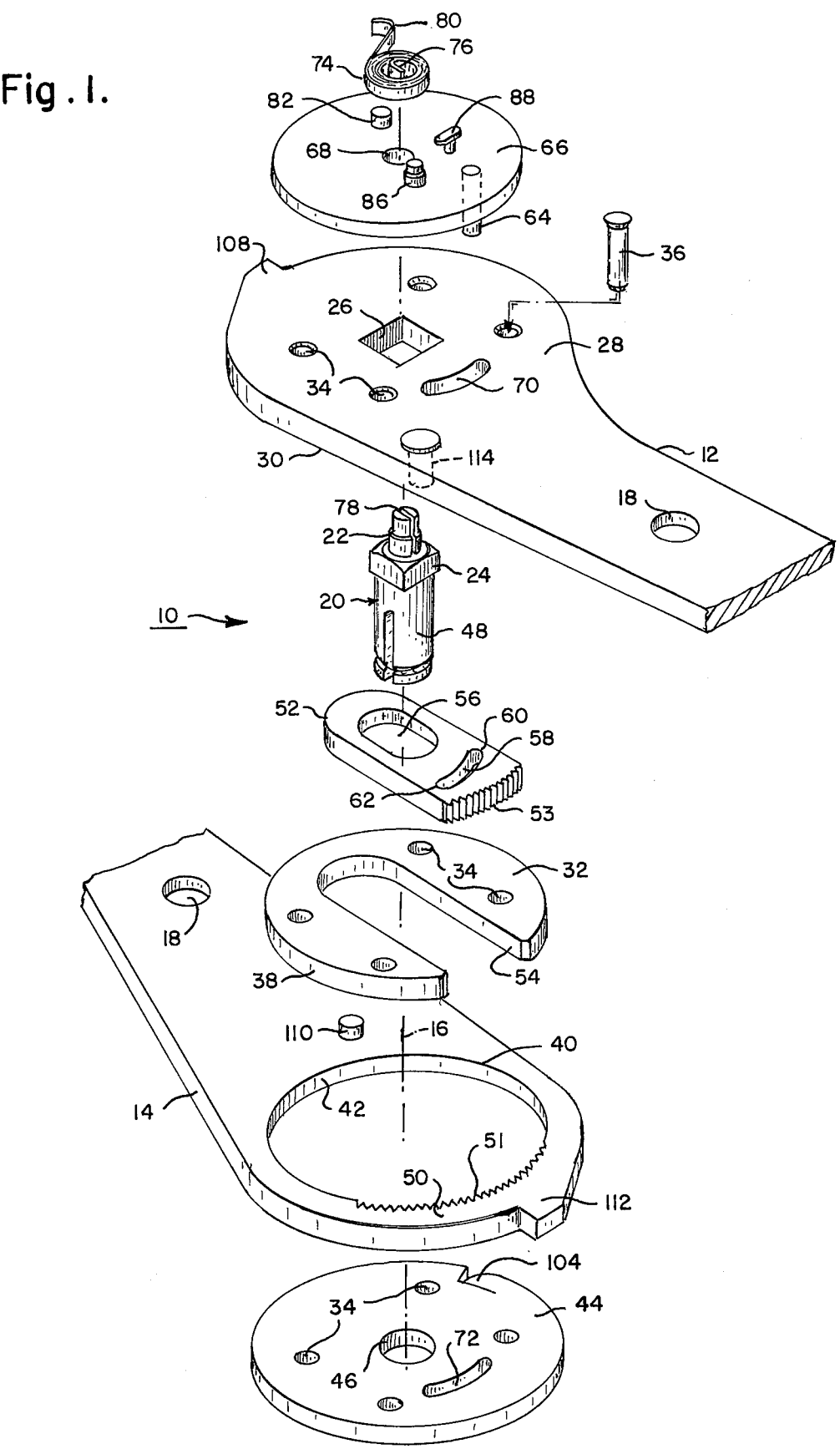
FIG. 1 is a perspective view of the preferred embodiment of the present invention to be utilized on the right or passenger seat of a vehicle showing various members thereof in exploded positions.

As seen in FIGS. 1–5, the preferred embodiment of the present invention includes an adjustable hinge 10 having a first arm 12 and a second arm 14 adapted to be mounted for rotation of one with respect to the other about an operating axis 16. Each Each arm 12 and 14 includes a number of holes 18 therethrough to facilitate mounting of the hinge respectively to the cushion frame and the back frame of, in the case of the preferred embodiment, the right or passenger seat of a vehicle (not shown).

The preferred hinge 10 further includes a pivot pin 20 having a cylindrical first end 22 and an intermediate portion 24 having a squared cross section. The intermediate portion 24 of the pivot pin 20 is generally received within a square opening 26 of the first arm 12 during assembly to be retained therein as will be discussed further hereinbelow. With the pivot pin 20 so positioned relative to the first arm 12, the cylindrical end 22 thereof extends outwardly of a first side 28 of the first arm 12. Mounted against the other side 30 of the first arm 12 is a bearing element 32 which is utilized to basically mount the second arm 14 for rotation relative to the first arm 12. A plurality of holes 34 through the first arm 12 and the bearing element 32 receives a plurality of rivets 36 for fixedly securing the element 32 to the arm 12. The bearing element 32 includes a bearing surface 38 which includes at least a substantial portion thereof lying within a cylindrical surface which is coaxially aligned with the axis 16. A portion of the bearing surface 38 is removed without altering the support which it is capable of providing the second arm 14 and will be discussed in detail hereinbelow.

To facilitate mounting of the second arm 14 relative to the first arm 12 at the bearing element 32, the second arm 14 includes a large opening 40 therethrough having a peripheral mating bearing surface 42 extending about the majority of its diameter for sliding contact with the bearing surface 38 of the element 32. To retain the second arm 14 adjacent the first arm 12, a retention plate 44 is provided which also includes aligned holes 34 for receipt of the previously mentioned rivets 36 to complete the rigid mounting of the first arm 12, bearing element 32 and retention plate 44. The retention plate 44 includes a central hole 46 therethrough for receipt of the second end 48 of the pivot pin 20 and has outer dimensions which cause it to overlie the second arm 14 to prevent its movement along the axis 16.

Figure 3:
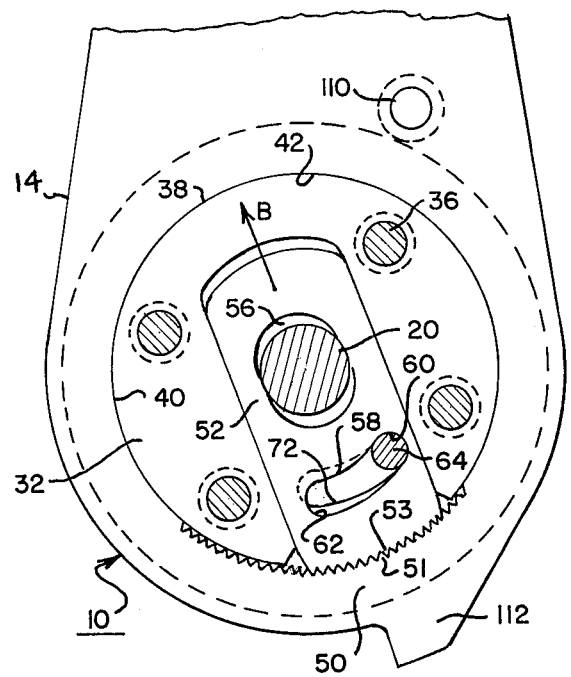
FIG. 3 is a side elevation of the internal workings of the preferred embodiment generally viewed from line 3—3 as shown in FIG. 4.

As seen in FIG. 3, one circumferential section of the opening 40 includes an arcuate rack 50 having, in the preferred embodiment, an effective radius slightly larger than the bearing surface 42 to prevent interference of the teeth 51 thereof with the bearing surface 38 of the bearing element 32 during relative movement of the second arm 14 with respect to the first arm 12. The arcuate rack 50 is provided on the second arm 14 to generally include a means for engaging the second arm 14 at a predetermined angle relative to the first arm 12 according to the desires of the seat occupant. The present invention includes a locking pawl 52 having a plurality of teeth 53 to provide a means relative the first arm 12 for selective engagement with and disengagement from the matching teeth 51 of the arcuate rack 50.

In the preferred embodiment 10, the locking pawl 52 is mounted within a cavity 54 of the bearing element 32 to be capable of limited radial movement toward and away from the arcuate rack 50. Additionally, the pawl 52 is provided an elongated opening 56 therethrough for receipt of the pivot pin 20 to facilitate assembly of the hinge 10 while still allowing the desired radial movement of the pawl 52 relative to the pivot pin 20. As can be seen from the view of the preferred hinge 10 in FIGS. 1 and 4, the retention plate 44 is also dimensioned to overlie the locking pawl 52 to maintain it in general alignment with the rack 50 throughout use of the hinge 10. To produce the desired movement of the locking pawl 52 to ensure its selective engagement with and disengagement from the rack 50, an arcuate slot 58 is provided therethrough. The arcuate slot 58 has a first end 60 which is closer to the axis 16 throughout radial movement of the pawl 52 than is the second end 62. The arcuate slot 58 provides a camming surface which is adapted to receive a pawl locating pin 64 therethrough. To provide a means for control and support of the pawl locating pin 64, it is rigidly mounted to a pawl actuating device 66 which is operatively mounted adjacent the side 28 of the first arm 12.

The pawl actuating device 66 includes a hole 68 therethrough adapted to be received around the cylindrical end 22 of the pivot pin 20. The pawl locating pin 64 is displaced a predetermined distance from and extends in a direction generally parallel with the axis 16 and is supported in its movement of the pawl 52 by being received within a pair of aligned slots 70 and 72 which are respectively provided the first arm 12 and the retention plate 44. The slots 70 and 72 are arcuate in shape and have an effective radius from the axis 16 which is equal to the predetermined distance of the locating pin 64 from the axis 16. Accordingly, as the locating pin 64 rigidly extends from the pawl actuating device 66, it is aligned with and received within each of the slots 70 and 72 for general support thereof during its movement about the axis 16. Therefore, movement of the locating pin 64 causes radial movement of the pawl 52 as it acts on the arcuate slot 58 but the slots 70 and 72 ensure that it is supported throughout operation of the hinge to minimize the effect which could be produced by forces acting on the pin if it were simply extended in a cantilevered manner.

Figure 2:
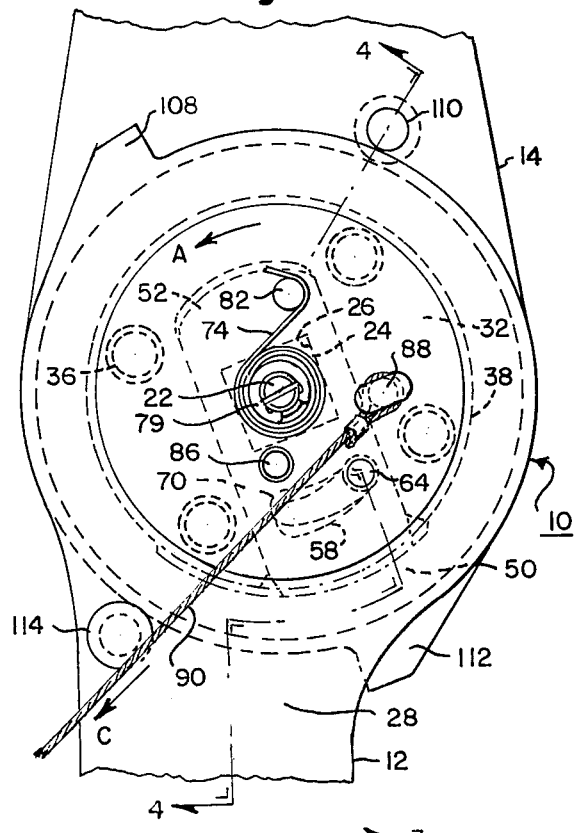
FIG. 2 is a side elevation of the embodiment shown in FIG. 1 as seen from the right hand side of the vehicle.
Figure 4:
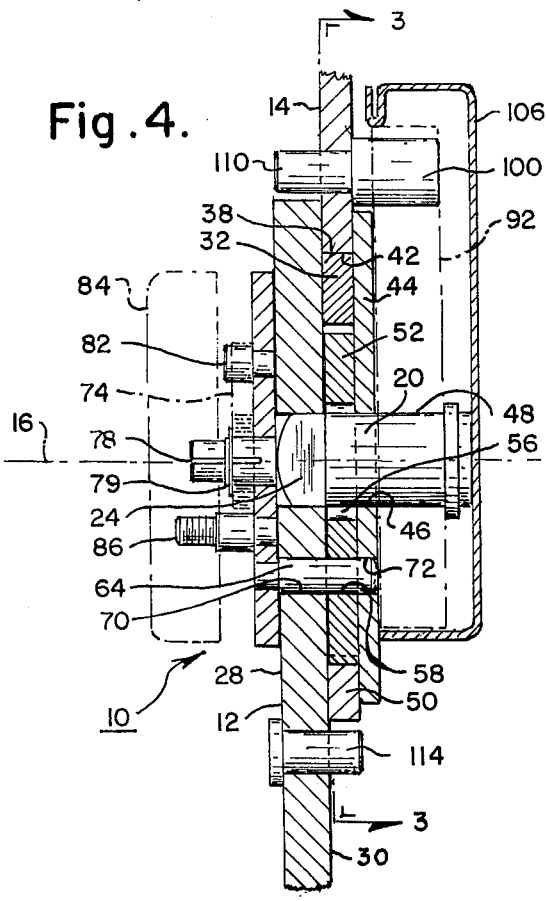
FIG. 4 is a sectional side view of the preferred embodiment as shown along line 4—4 of FIG. 2.
Figure 5:
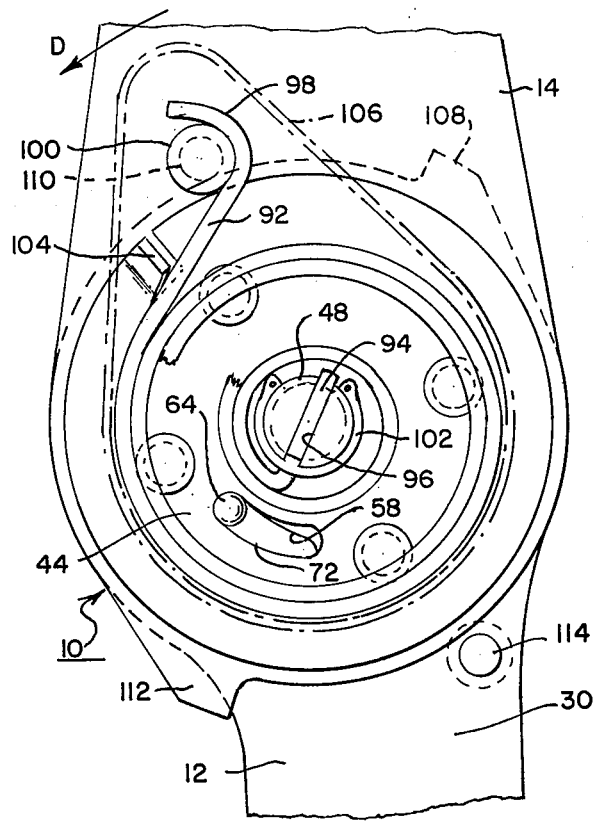
FIG. 5 is an elevational view of the preferred embodiment showing the side thereof which is positioned against the vehicle seat.

As thus explained, there has been provided through the pawl actuating device 66 and attached locating pin 64 an adequate means for locating of the pawl 52. However, it is desirable to ensure that the pawl 52 will be maintained in engagement with the arcuate rack 50 during use of the vehicle seat until the occupant desires to change the relative angle of the arms of the hinge 10 to readjust the seat. Accordingly, the pawl actuating device is biased in a direction generally indicated by the arrow A to locate the pin 64 at the end 60 of the slot 58. With the pin 64 at the end 60 of the slot 58, the pawl 52 is radially positioned outwardly for full engagement with the arcuate rack 50. In the preferred embodiment of the invention the biasing of the pawl actuating device 66 is accomplished with a coil spring 74 having a first end 76 which is received within a slot 78 in the end 22 of the pivot pin 20. The spring 74 is retained on the end 22 with a C-clip 79 as shown in FIGS. 2 and 4. The second end 80 of the spring 74 acts on a tab 82 rigidly extending from the actuating device 66. Therefore, when the occupant desires to adjust the hinge 10, rotation of the actuating device 66 in a direction opposite that indicated by the arrow A in opposition to the biasing of the spring 74 will rotationally reposition the pin 64 within the slots 70 and 72 and cause it to move toward the end 62 of the slot 58 of the pawl 52. When the pin 64 is at the end 62 of the slot 58, which is more remote than the end 60 from the axis 16 throughout radial movement of the pawl 52, the pawl 52 will be moved radially in a direction indicated by the arrow B out of engagement with the arcuate rack 50. When the pawl 52 is disengaged from the rack 50, the seat can be adjusted to alter the angle of the hinge arm 14 with respect to the arm 12 until a desired angle is obtained. Allowing the actuating device 66 to return to its biased position will cause the locating pin 64 to again act on the slot 58 to return the pawl 52 into engagement with the rack 50 to maintain the desired angle between the hinge arms 12 and 14.

In the preferred adjustable hinge 10, two means are provided for rotation of the actuating device 66 against biasing. As seen in FIG. 4, a handle 84 is secured to the actuating device 66 at a threaded fitting 86. The fitting 86 is displaced from the center of the actuating device 66 because of the nonrotating pivot pin extending therethrough, but is adapted to receive the handle 84 which is generally aligned with the axis 16 to overlie the pivot pin 20 so that rotation of the handle is, nevertheless, about the axis 16. Additionally, a T-fitting 88 is provided on the actuating device 66 at a location which is remote from the axis 16 to receive the end of a cable 90 which allows remote control of the actuating device 66. As seen in FIG. 2, a remote lever device (not shown) can be rotated to pull the cable 90 in a direction as generally shown by the arrow C to rotate the actuating device against the biasing of the spring 74 in a manner similar to that produced by the handle 84. When the preferred hinge 10 is installed on a seat, the T-fitting 88 and cable 90 will be in an unexposed location behind the seat trim so that it will not interfere with the operation of the actuating device 66 by the handle 84 which will be located outwardly of the seat trim.

While the preferred hinge 10 as described above includes means for selectively releasing and maintaining the arms 12 and 14 at a desired angle, there are additional features desirable when utilized in an automotive seat configuration. As primarily seen in FIGS. 4 and 5, the preferred hinge is provided a counterbalanced spring 92 which is designed to provide biasing of the back frame relative to the cushion frame in a forward direction when the back frame is generally located between an upright position and an extreme rearward position. The spring 92 thus enables the occupant to more readily select the slope of the back frame as he operates the actuating device 66. The spring 92 is adapted to bias the second arm 14 by having the first end 94 thereof received within a slot 96 of the end 48 of the pin 20 as the other end 98 acts on a fixed pin 100 of the second arm 14. Since the pin 20, as discussed hereinabove, is rigidly secured to the first arm 12, the spring 92 as thus mounted produces the desired biasing between the back frame and the cushion frame in a direction as generally indicated by the arrow D. The spring 92 is located about the end 48 of the pin 20 to lie adjacent the retention plate 44 and is retained thereon by a C-clip 102. To prevent the spring 92 from applying a biasing force to the back frame at locations thereof from the generally upright position to an extreme forward position, an extension 104 on the retention plate 44 is provided to make contact with the spring 92 when the back frame is at the upright location. Accordingly, the back frame may be positioned forwardly, in a counter-clockwise direction from the location shown in FIG. 5 without the back frame being biased by the spring 92. This enables one to release and relocate the back frame for allowing an occupant to enter the back seat of the vehicle without having the biasing of spring 92 interfere with the user. A light cover 106 is installed over the spring 92 prior to installation of the hinge 10 on the back frames to prevent the cushion stuffing, etc. from interfering with the operation of the spring.

To generally maintain the arm 12 and the arm 14 within predetermined angular limits with respect to each other, a pair of stop devices are provided. In the preferred embodiment, an extension 108 on the first arm 12 is provided to make contact with an extended fitting 110 on the second arm 14 when the back frame is at an extreme rear position. A similar extended fitting 112 on the second arm 14 and extended fitting 114 on the first arm 12 similarly prevent forward movement of the back frame beyond an extreme forward position.

While particular embodiments of the present invention have been illustrated and described herein, it is, of course, to be understood that changes and modifications may be made herein within the scope of the following claims.

I claim:

1. An adjustable hinge comprising:
   a first arm;
   a pivot pin rigidly secured to said first arm to extend to at least one side thereof along an axis;
   a bearing element extending from the other side of said arm and having a first bearing surface lying at least partially within a cylindrical surface which is coaxially aligned with said pivot pin;
   a second arm having an opening therethrough which is at least partially defined by a second bearing surface generally matching said first bearing surface, said bearing element being received within said opening to mount said second arm for rotation relative to said first arm about said axis, said second arm including an arcuate toothed rack coaxially aligned with said second bearing surface;
   an arm retention plate fixedly mounted relative to said bearing element to overlie said second arm for retention of said second arm on said bearing element;
   a toothed locking pawl mounted relative to said first arm in general alignment with said arcuate rack for radial movement with respect to said axis for selectively engaging with and disengaging from said arcuate rack, said pawl having an arcuate slot therethrough which includes a first end which is closer to said pivot pin than a second end thereof;
   a pawl actuating device pivotally mounted on said pivot pin and including a pawl locating pin displaced a predetermined distance from and extending in a direction parallel with said axis to be commonly received within said arcuate slot of said pawl and matching, aligned slots through said first arm and said retention plate; and
   each of said aligned slots having an arcuate shape with an effective radius from said axis equal to said predetermined distance, said first arm and said retention plate supporting said locating pin at said aligned slots therethrough at both sides of said pawl to distribute operating forces acting along said locating pin during movement of said pawl thereby.

2. An adjustable hinge as set forth in claim 1, further including means for biasing said pawl actuating device around said pivot pin tending to cause said locating pin to be positioned within said arcuate slot at said first end thereof to cause engagement of said locking pawl with said toothed rack.

3. An adjustable hinge as set forth in claim 1, further including means for rotation of said pawl actuating device including a handle rigidly secured to said pawl actuating device at a location thereon remote from said pivot pin.

4. An adjustable hinge as set forth in claim 3, further including means for rotating said pawl actuating device from a location remote from said hinge.

5. An adjustable hinge as set forth in claim 4, wherein said means for rotating said pawl actuating device from a location remote from said hinge includes cable actuating means and means for mounting the power cable of said cable actuating means to said pawl actuating device.

6. An adjustable hinge as set forth in claim 1, further including means for biasing said first arm relative to said second arm tending to reduce an angle therebetween.

* * * * *